US008307442B2

(12) United States Patent
Asati et al.

(10) Patent No.: US 8,307,442 B2
(45) Date of Patent: Nov. 6, 2012

(54) METHOD OF PREVENTING INFECTION PROPAGATION IN A DYNAMIC MULTIPOINT VIRTUAL PRIVATE NETWORK

(75) Inventors: Rajiv Asati, Morrisville, NC (US); Mohamed Khalid, Cary, NC (US); Haseeb Niazi, Morrisville, NC (US); Jason Guy, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 1622 days.

(21) Appl. No.: 11/497,956

(22) Filed: Aug. 1, 2006

(65) Prior Publication Data

US 2008/0047011 A1    Feb. 21, 2008

(51) Int. Cl.
 *H04L 29/06* (2006.01)
(52) U.S. Cl. .......... 726/24; 370/351; 709/223; 709/224; 709/225; 713/188; 726/22; 726/23
(58) Field of Classification Search .................. 709/225; 726/24
 See application file for complete search history.

(56) References Cited

U.S. PATENT DOCUMENTS

| | | | | |
|---|---|---|---|---|
| 5,086,428 A | * | 2/1992 | Perlman et al. | 370/394 |
| 7,062,782 B1 | * | 6/2006 | Stone et al. | 726/22 |
| 7,525,921 B1 | * | 4/2009 | Yi Dar Lo | 370/241 |
| 2004/0003285 A1 | * | 1/2004 | Whelan et al. | 713/201 |
| 2004/0098482 A1 | * | 5/2004 | Asano | 709/225 |
| 2006/0230444 A1 | * | 10/2006 | Iloglu et al. | 726/14 |
| 2006/0282887 A1 | * | 12/2006 | Trumper et al. | 726/11 |
| 2006/0282895 A1 | * | 12/2006 | Rentzis et al. | 726/24 |
| 2007/0002838 A1 | * | 1/2007 | Komura et al. | 370/352 |
| 2007/0101429 A1 | * | 5/2007 | Wakumoto et al. | 726/23 |
| 2007/0130427 A1 | * | 6/2007 | Lahti et al. | 711/133 |
| 2008/0049764 A1 | * | 2/2008 | Solomon et al. | 370/401 |
| 2012/0113991 A1 | * | 5/2012 | Satterlee et al. | 370/401 |

OTHER PUBLICATIONS

Luciani et al., RFC 2332—"NBMA Next Hop Resolution Protocol (NHRP)", Apr. 1998, sections 5.2.5-5.2.6.*
Bhargava et al., "Security Enhancements in AODV protocol for Wireless Ad Hoc Networks", 2001, pp. 2143-2147.*

* cited by examiner

*Primary Examiner* — Taghi Arani
*Assistant Examiner* — Thaddeus Plecha
(74) *Attorney, Agent, or Firm* — Hickman Palermo Truong Becker Bingham Wong LLP

(57) ABSTRACT

A method, apparatus and computer program product for preventing infection propagation in a DMVPN is presented. An infected spoke router site is isolated from the DMVPN network such that the spoke router may (bi-directionally) completely or partially limit communicating with any network devices (including the hub router, any other spoke routers etc.) within the DMVPN which prevents the DMVPN meltdown, isolates a worm-infected spoke router site from the rest of the DMVPN and restricts the spread of the worm within the DMVPN network.

27 Claims, 4 Drawing Sheets

METHOD OF PREVENTING INFECTION PROPAGATION IN A DYNAMIC MULTIPOINT VIRTUAL PRIVATE NETWORK

BACKGROUND

Virtual Private Networks (i.e., VPNs) provide a secured means for transmitting and receiving data between network nodes even though many users share a corresponding physical network supporting propagation of the data. Privacy is maintained through the use of a tunneling technique, such as generic routing encapsulation (GRE). The data transmitted between such network nodes may be encrypted to protect against eavesdropping and tampering by unauthorized parties. Because the physical network is shared, costs of using resources are generally reduced for each of many users.

A particular type of VPN is known as a Dynamic Multipoint VPN (DMVPN). DMVPN allows users to better scale large and small Internet Protocol Security (IPSec) VPNs by combining Generic Routing Encapsulation (GRE) tunnels, IPSec encryption, and Next Hop Resolution Protocol (NHRP) to provide users with easy configuration.

IPSec VPNs are built as a collection of point-to-point links. The most efficient way to manage larger and larger collections of these point-to-point links is to arrange them into hub router-and-spoke router networks. All traffic from behind one spoke router (i.e., the traffic from networks that must travel through the spoke router to get to the hub router) to behind another spoke router will need to traverse first to the hub router and then back out to the other spoke router.

Routers define nodes in a network, and data travels between the nodes in a series of so-called "hops" over the network. Since each router is typically connected to multiple other routers, there may be multiple potential paths between given computers. Typically, the routing information is employed in a routing table in each router, which is used to determine a path to a destination computer or network. The router makes a routing decision, using the routing table, to identify the next "hop," or next router, to send the data to in order for it to ultimately reach the destination computer.

In a DMVPN environment, each spoke router has a "permanent" (i.e., always-on) IPSec tunnel to a hub router, but not to the other spoke routers within the network. Each spoke router registers as clients of the NHRP server, which may reside in the hub router. The hub router maintains an NHRP database of the publicly routable address(es) of each spoke router. Each spoke router registers its binding of "publicly routable" address and (private) tunnel address when it boots and becomes capable of querying its NHRP database for the publicly routable addresses of the destination (remote) spoke routers in order to build direct tunnels to the destination spoke routers, when needed.

When a spoke router needs to send a packet to a destination subnet on another (remote) spoke router, it queries the NHRP server for publicly routable address of the destination (remote) spoke router. The spoke router also obtains the 'next hop' for that destination spoke router from the NHRP server. After the originating spoke router learns the peer address of the remote spoke router, it can initiate a dynamic IPSec tunnel to the remote spoke router. The spoke router-to-spoke router tunnels are established on-demand whenever there is traffic between the spoke routers. Thereafter, packets are able to bypass the hub router and use the spoke router-to-spoke router tunnel. Once the transfer is complete, the spoke router-to-spoke router tunnel is torn down.

DMVPN provides on-demand creation of IPSec encrypted GRE tunnels for direct spoke router-to-spoke router communication and even builds a fully-meshed network, if needed. The spoke router-to-spoke router tunnels are dynamically created based on the interesting traffic from one spoke router site to another spoke router site so as to bypass the Hub router. A spoke router site includes any of the hosts (also referred to as netowkr devices) inside a spoke router of the DMVPN network as well as the spoke router itself.

SUMMARY

Conventional mechanisms such as those explained above suffer from a variety of deficiencies. One such deficiency is that while conventional DMVPN technology provides an efficient/scalable framework in which the network resources (such as IPSec SAs) are only claimed when needed as each spoke router site dynamically establishes the tunnel to every other spoke router site triggered by the interesting traffic (received internally from the site), it leaves an opportunity in which one infected spoke router site can disrupt the whole DMVPN network. If any of the hosts (collectively with the spoke router referred to as a spoke router site) inside a spoke router of the DMVPN network becomes infected with a worm (such as a polymorphic worm), then the worm could indirectly exploit the dynamic nature of DMVPN to an extent of "melting down" the DMVPN network. In other words, the worm can potentially over-run the maximum number of tunnels that spoke routers can handle and/or bombard the hub router with hundreds of Resolution Requests, resulting in a Distributed Denial of Service (DDOS) attack. In conventional systems there is no efficient mechanism to prevent the DMVPN melt-down, to isolate the worm-infected spoke router site and to restrict the spread of the worm within the DMVPN network.

Although the mechanisms by which the worm propagates within an enterprise network is well known, its propagation when combined with the dynamic nature of DMVPN results in an undesired effect in which the spoke router site sends Resolution Requests in the order of few tens to few thousands to the hub router site. This could potentially cause the hub router to become unstable and if more than one spoke router site becomes infected, then the hub router will get overwhelmed by so many messages that it would potentially drop the important control plane traffic. The hub router indirectly becomes the DDOS target. Certain polymorphic worms can mount attacks to every possible IP address within an enterprise (public IP address subnet assignment to an enterprise is publicly known) and can melt-down the whole DMVPN Network.

The present method of preventing infection propagation in a DMVPN isolates the infected spoke router site from the DMVPN network, if needed. This causes the spoke router of the spoke router site having an infected host to (bi-directionally) stop communicating with any network devices (including the hub router, any other spoke routers etc.) within the DMVPN.

In another embodiment, the present method of preventing infection propagation in a DMVPN isolates the infected spoke router site such that it can only communicate with the hub router, but cannot communicate with any remote spoke router site. This provides the opportunity for the hub router to redirect the received traffic to a Scrubber, if needed to separate out the "good" traffic from the "bad" traffic and forward the good traffic to the relevant destinations.

In a particular embodiment of a method of preventing infection propagation in a DMVPN the method includes receiving an indication at a hub router that a spoke router site including a spoke router in communication with the hub router has become infected and sending a purge message to the spoke router of the spoke router site, the purge message directing the spoke router to purge at least one NHRP request. The method further includes receiving the purge message at the spoke router, and purging, by the spoke router, cached entries in a forwarding database and refraining from resolving any next-hop requests. The purge request is also sent to other spoke routers, which are part of the DMVPN network, to purge the infected spoke router from their next hop database.

Other embodiments include a computer readable medium having computer readable code thereon for preventing infection propagation in a DMVPN. The computer readable medium includes instructions for receiving an indication at a hub router that a spoke router site including a spoke router in communication with the hub router has become infected and instructions for sending a purge message to the spoke router, the purge message directing the spoke router to purge at least one NHRP request. The computer readable medium further includes instructions for receiving the purge message at the spoke router and instructions for purging, by the spoke router, cached entries in a forwarding database and refraining from resolving any next-hop requests.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a method of preventing infection propagation in a DMVPN as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a method of preventing infection propagation in a DMVPN as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, Calif.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
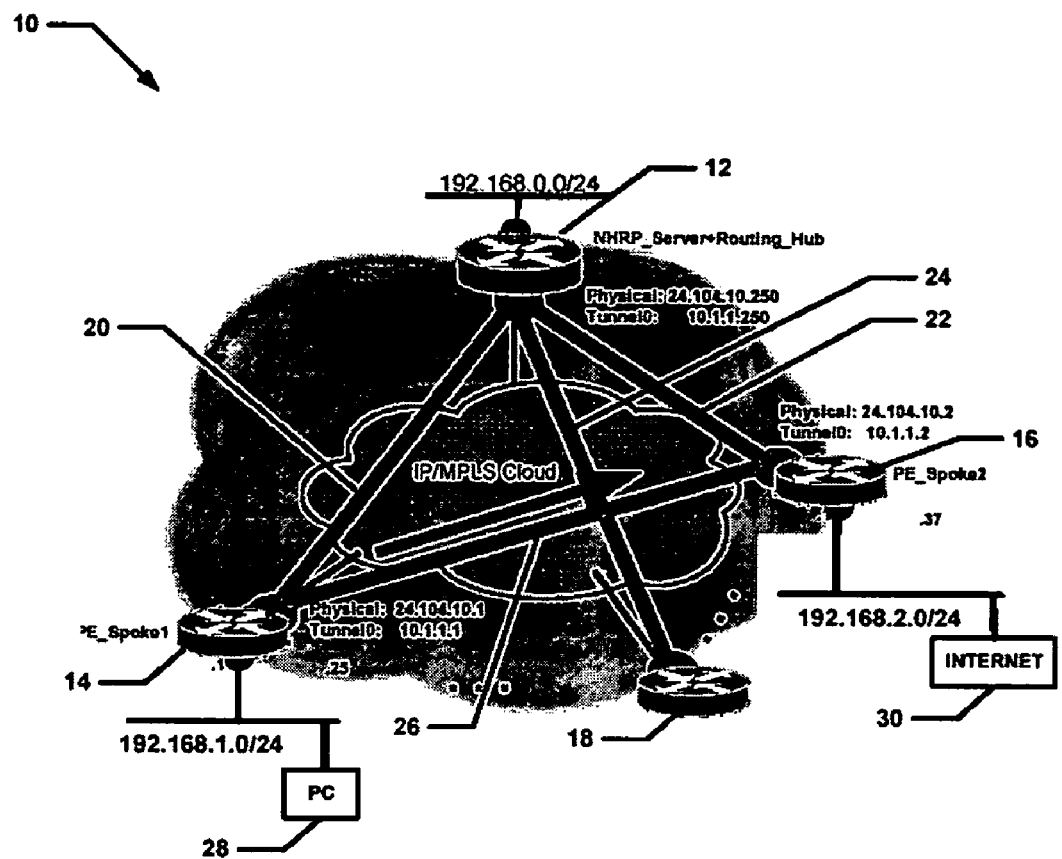
FIG. 1 comprises a DMVPN environment wherein infection propagation is prevented in accordance with embodiments of the invention.

Referring to FIG. 1, an example of a DMVPN environment 10 is shown. A Hub router 12, is in communication with a plurality of spoke routers 14, 16 and 18. This is accomplished by an IPSec tunnel extending from the hub router 12 to each spoke router 14, 16 and 18. A spoke router may be part of a spoke router site which includes the spoke router and other devices (referred to as hosts) in communication with the spoke router. For example, spoke router 14 and PC 28 make up a spoke router site. In this example environment 10, hub router route 12 has a tunnel 20 to spoke router 14, a tunnel 22 to spoke router 16 and a tunnel 24 to spoke router 18.

In the DMVPN environment 10, each spoke router (14, 16 and 18) has a "permanent" IPSec tunnel to the hub router 12, but not to the other spoke routers within the network. Each spoke router (12, 14 and 16) registers as clients of the NHRP server, which may reside in the hub router 12. The hub router 12 maintains an NHRP database of the publicly routable address(es) of each spoke router. Each spoke router registers its binding of "publicly routable" address and (private) tunnel address when it boots and becomes capable of querying its NHRP database for the publicly routable addresses of the destination (remote) spoke routers in order to build direct tunnels to the destination spoke routers, when needed.

When a spoke router needs to send a packet to a destination subnet on another (remote) spoke router, it queries the NHRP server for publicly routable address of the destination (remote) spoke router. The spoke router also obtains the 'next hop' for that destination spoke router from the NHRP server. After the originating spoke router learns the peer address of the remote spoke router, it can initiate a dynamic IPSec tunnel to the remote spoke router. The spoke router-to-spoke router tunnels are established on-demand whenever there is traffic between the spoke routers. Thereafter, packets are able to bypass the hub router and use the spoke router-to-spoke router tunnel. An example of this is shown by spoke router-to-spoke router tunnel 26 which has been established between spoke router 14 and spoke router 16. This may be used for example when a packet received by spoke router router 14 from PC 28 is destined for Internet 30 via spoke router 16.

When a spoke router site of a DMVPN becomes infected with a worm, the worm can very quickly propagate by sending traffic to each possible destination within the enterprise network over DMVPN. If the infected host within a spoke router site sends out traffic to destinations residing in remote sites, the spoke router of the infected spoke router site will, by nature of DMVPN, automatically start setting up the IPSec and GRE tunnels to each remote spoke router site. Of course, to do this, spoke router will have to resolve the unresolved next-hops and hence send out the NHRP resolution request for each of the Next-Hops (DMVPN Phase II) or each of the prefixes (DMVPN Phase III).

In the event a Worm/DoS attack has been detected through an existing/known mechanism (e.g., by a security monitoring application or other type of mechanism) in a specific DMVPN spoke router site. In this example, spoke router 14 has become infected with a DDOS worm. Once it has been detected that a given spoke router site has one or more infected hosts, then the NHRP hub router 12 will immediately send an NHRP message (a NHRP "Purge All Request" message) to that spoke router. The NHRP Purge All Request message is sent in order to invalidate all the entries in a NHRP cache at the spoke router. Upon receiving such a message, the spoke router will clear at least one of the dynamically learned entries in the NHRP database (leaving only the statically configured NHRP mapping). When a spoke router receives an NHRP Purge All request, it must discard any previously cached information in the NHRP next-hop database.

This message may also include a NHRP extension "No Resolution Request Until Further Notice". The NHRP extension "No Resolution Request until Further Notice" conveys to the spoke router that the spoke router can not attempt to resolve any of the Next-hops until further notice. This extension, when combined with the "NHRP Purge All Request", would convey the receiver of the NHRP message to invalidate/flush all the dynamically learned/cached entries within the NHRP database and do not attempt to send any NHRP Resolution Request for them. Without this extension, the spoke router of the Purge All request" could flush all the entries within the NHRP database and generate NHRP Resolution Request message for each of the next-hops or prefixes.

Upon receiving the NHRP Purge All Request, the spoke router 14 flushes/invalidates all the cached entries in the NHRP database and will not attempt to resolve any of the next-hop or prefixes until requested by the hub router 12. This causes the spoke router 14 to use NHS's address to encapsulate all future data packets to divert the traffic to the hub router 12 automatically.

The spoke router 14 acknowledges the invalidation of the NHRP database by sending the NHRP "Purge All Reply" message to sender (hub router 12) of the NHRP Purge All Request message. The NHRP Purge All Reply message mentioned above is sent in order to ensure the sender of the Purge All Request, that all the cached information has been purged by the station sending the Reply. Since the NHRP database entries are already flushed/invalidated, the IPSec SAs associated with these entries will be torn down and will not be used for the direct spoke router-to-spoke router communication. Thus, spoke router-to-spoke router tunnel 26 is torn down.

It is important that hub router 12 also invalidates the NH information (for the infected spoke router) at all other spoke router's NHRP database. This can be done by letting the hub router 12 also send NHRP Purge Requests to all the spoke routers (e.g. spoke routers 16 and 18). The newly defined NHRP Extension "No resolution request until further notice" may also be appended within the NHRP Purge Request to ensure that the remote spoke routers do not attempt to resolve the next-hop belonging to the infected spoke router.

Other NHC/spoke routers receiving this NHRP Purge Request will discard the previously cached information that matches the information in the CIEs of the Purge Request message. They will also reply with the NHRP Purge Reply to the hub router 12 and do not send the NHRP Resolution Request for the specific address(es) specified within the CIE. This step is required to address the DMVPN_Phase_2 enhancements in which the spoke router can build the IPSec tunnel based on an NHRP Resume Reply from another spoke router.

Depending upon whether the hub router 12 has a traffic scrubber available, the Hub router could take either of the following two actions. If the hub router 12 doesn't have any scrubbing functionally for the infected traffic, then the hub router 12 may prefer to altogether avoid receiving the traffic from the infected spoke router site until or unless the spoke router site gets rid of the worm. Alternately, the hub router 12, upon receiving the traffic from the infected spoke router site, can redirect the traffic to a Scrubber for cleansing of the traffic. One the bad traffic has been separated from the good traffic, then the good traffic can be forwarded towards the relevant spoke routers.

In a further embodiment, either the NHRP or TRDP trigger could be used by the hub router 12 to send an Access control List (ACL) to the spoke router 14, which will simply install the ACL on either the outbound tunnel interface or the physical interface. This will cause all the spoke router-to-spoke router traffic to be dropped at the spoke router itself. Optionally, the ACL could be such that even the spoke router-to-Hub router traffic could be dropped, if needed.

Once it has been determined that the spoke router site is no longer infected (after taking the relevant corrective measures at the spoke router site), the hub router 12 triggers a new NHRP message (a NHRP Resume Resolution Request) requesting the spoke router 14 to start sending the Resolution Requests for the remote Next-hops or prefixes to the Hub router 12.

The hub router 12 triggers NHRP Resume Resolution Request towards other remote spoke routers as well, so as to request them to start sending the Resolution Request for the (previously infected spoke router's) Next-hop or prefixes to the Hub router 12.

The NHRP Resume Resolution Request message is sent in order to convey that the previously imposed restriction of "No Resolution Request until further Notice" has been removed. This message basically requests the receiver of the Resume Resolution Request, to start sending the NHRP Resolution Requests to the NHRP Server for the relevant destinations.

After receiving the NHRP Resume Resolution Request message, the spoke router 14 will send a NHRP Resume Resolution Reply message to the hub router (NHS) 12. The Hub router 12 will start resolving the relevant next-hops or prefixes. The NHRP Resume Resolution Reply message is sent in order to ensure the sender of the Resume Resolution Request, that sender of the Reply has lifted the restriction imposed earlier and is going to start sending the "NHRP Resolution requests" for the relevant destinations.

In another embodiment NHRP throttling can be employed as a safety measure, This can be accomplished by defining a limit on the number of "NHRP resolution requests" and "NHRP Resolution Replies" at both hub router and spoke routers. This limit could be applied on a per NHC basis. The NHRP throttling rate monitoring, combined with other events, could provide a means to detect a DoS attack.

While a spoke router site is infected and the prevention of the infection propagation is being pursued, the IPSec SAs between the spoke router of the infected spoke router site and other spoke routers are immediately torn down by the spoke router of the infected spoke router site, and the NHRP cache information for the infected spoke router site doesn't exist anymore. The remote spoke routers will not try to establish sessions. Until then, the traffic in reverse direction is forwarded to the hub router, which could optionally redirect this traffic to the Scrubber as well or directly forward the traffic to the spoke router of the infected spoke router site. This enables the hub router to gain full control on the traffic sent by/to the infected spoke router sites.

Once all the NHRP next-hop entries get invalidated, the spoke router of the infected spoke router site could potentially continue to send NHRP resolution requests to the hub router for each of the remote spoke router (DMVPN phase 2) or remote prefixes (DMVPN phase 3). Hence, the possibility of hub router getting unstable increases dramatically as there could be thousands of requests pouring in at the hub router. The extension is interpreted by spoke router/NHC as the order to stop sending Resolution Requests until further notice.

Figure 2A:
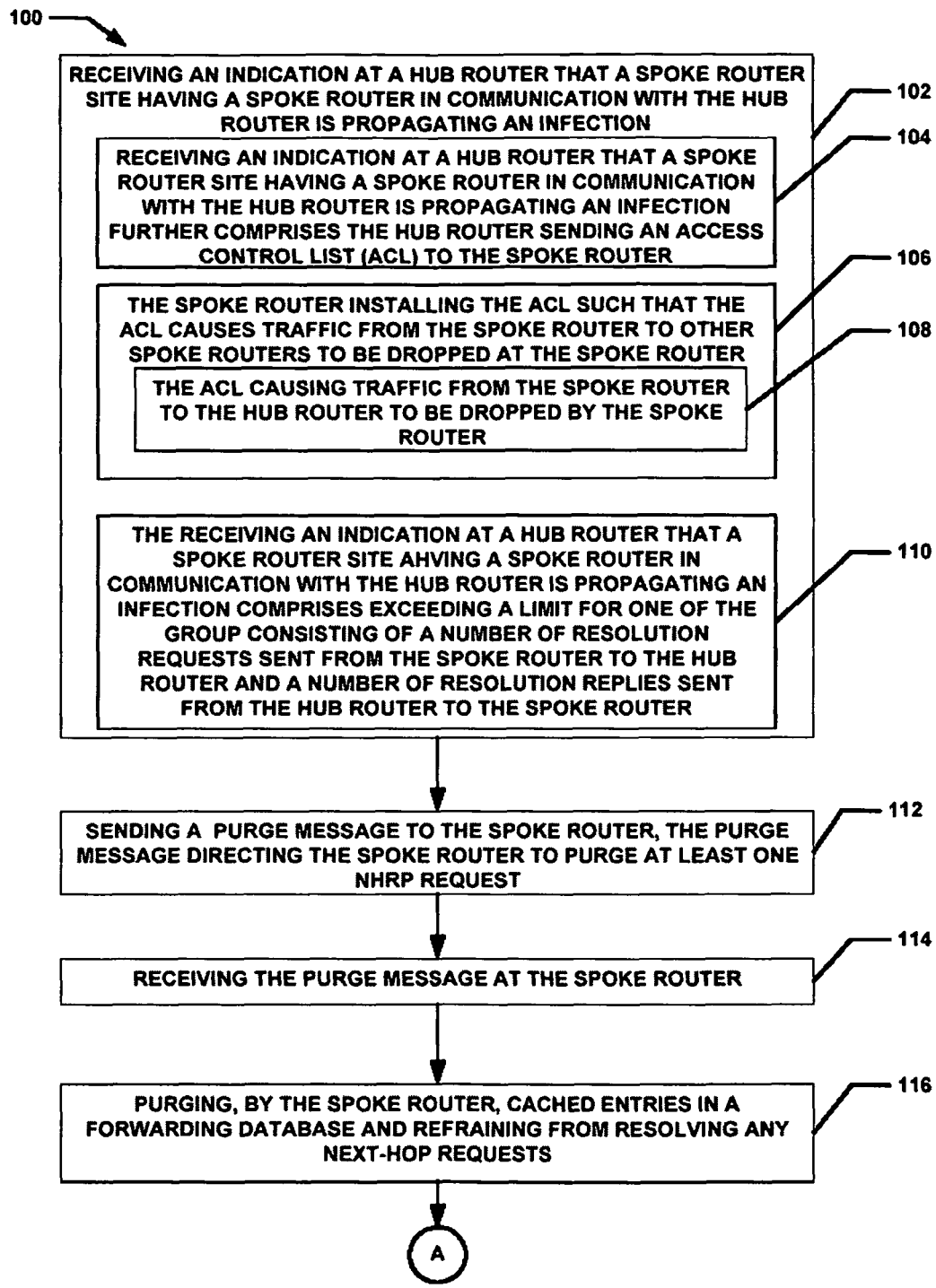
FIGS. 2A and 2B comprise a flow diagram of a particular embodiment of a method of preventing infection propagation in a Dynamic Multipoint Virtual Private Network in accordance with embodiments of the invention.
Figure 2B:
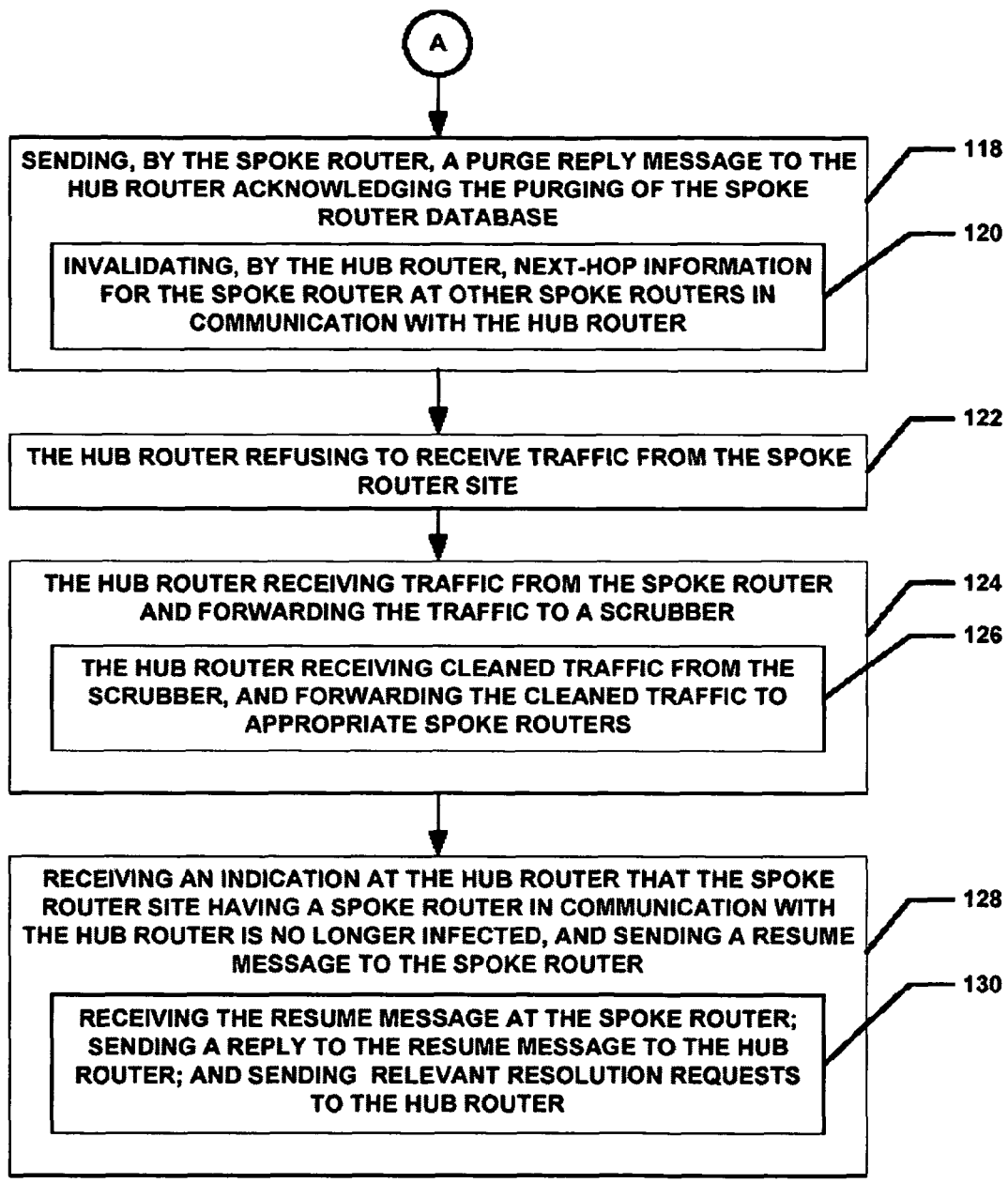

A flow chart of the presently disclosed method is depicted in FIGS. 2A and 2B. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 2A and 2B, a method 100 for preventing infection propagation in a Dynamic Multipoint Virtual Private Network is shown. The method begins with processing block 102 which discloses receiving an indication at a hub router that a spoke router site having a spoke router in communication with the hub router has an infection. The infection may be caused by a Worm/DoS attack and has been detected through an existing/known mechanism (e.g., by a security monitoring application or other type of mechanism) in a specific DMVPN spoke router site.

Processing block 104 states receiving an indication at a hub router that a spoke router site having a spoke router in communication with the hub router propagating an infection further comprises the hub router sending an Access Control List (ACL) to the spoke router. Processing block 106 recites the spoke router installing the ACL such that the ACL causes traffic from the spoke router to other spoke routers to be dropped at the spoke router. The spoke router will simply install the ACL on either the outbound tunnel interface or the physical interface.

Processing continues with processing block 108 which discloses the ACL causing traffic from the spoke router to the hub router to be dropped by the spoke router. Optionally, the ACL could be such that even the spoke router-to-Hub router traffic could be dropped, if needed.

Processing block 110 states wherein the receiving an indication at a hub router that a spoke router site having a spoke router in communication with the hub router has become infected comprises exceeding a limit for one of the group consisting of a number of resolution requests sent from the spoke router to the hub router and a number of resolution replies sent from the hub router to the spoke router. This is known as NHRP throttling and can be employed as a safety measure. This limit could be applied on a per NHC basis. The NHRP throttling rate monitoring, combined with other events, could provide a means to detect a DoS attack.

Processing block 112 recites sending a purge message to the spoke router, the purge message directing the spoke router to purge all requests. Processing block 114 discloses receiving the purge message at the spoke router.

Processing block 116 states purging, by the spoke router, cached entries in a forwarding database and refraining from resolving any next-hop requests, to invalidate/flush all the dynamically learned/cached entries within the NHRP database and do not attempt to send any NHRP Resolution Request for them.

Processing block 118 recites sending, by the spoke router, a purge reply message to the hub router acknowledging the purging of the spoke router database. Since the NHRP database entries are already flushed/invalidated, the IPSec SAs associated with these entries will be torn down and will not be used for the direct spoke router-to-spoke router communication. Thus, spoke router-to-spoke router tunnels are torn down.

Processing block 120 discloses invalidating, by the hub router, next-hop information for the spoke router at other spoke routers in communication with the hub router. This can be done by letting the hub router also send NHRP Purge Requests to all the spoke routers. The newly defined NHRP Extension "No resolution request until further notice" is also appended within the NHRP Purge Request.

Processing block 122 states the hub router refusing to receive traffic from the spoke router. This is done until the spoke router site becomes uninfected.

Processing block 124 recites the hub router receiving traffic from the spoke router and forwarding the traffic to a scrubber. The scrubber separates the bad traffic from the good traffic. Processing block 126 discloses the hub router receiving cleaned traffic from the scrubber, and forwarding the cleaned traffic to appropriate spoke routers.

Processing block 128 recites receiving an indication at the hub router that the spoke router site having a spoke router in communication with the hub router is no longer infected, and sending a resume message to the spoke router.

Processing block 130 discloses receiving the resume message at the spoke router, sending a reply to the resume message to the hub router, and sending relevant resolution requests to the hub router.

Figure 3:
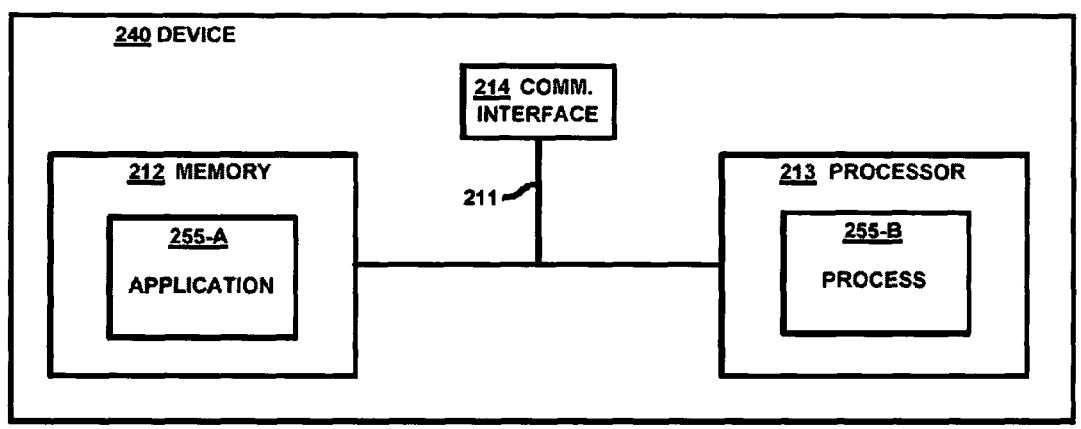
FIG. 3 illustrates an example network device architecture that provides method of preventing infection propagation in a Dynamic Multipoint Virtual Private Network in accordance with embodiments of the invention.

FIG. 3 illustrates example architectures of a computer system 240 that is configured as a network device. The computer system 240 may be any type of computerized system such as a personal computer, workstation, portable computing device, mainframe, spoke router, hub router, host, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding agent process 255-B. In other words, the agent process 255-B represents one or more portions of the agent application 255-A performing within or upon the processor 213 in the computer system. It is to be understood that the agent 255 operate as explained in former examples are represented in FIG. 5 by the agent application 255-A and/or the process 255-B.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

The presently described method, software and apparatus for preventing infection propagation in a DMVPN provide an efficient mechanism to prevent the DMVPN melt-down, to isolate a worm-infected spoke router site from the rest of the DMVPN and to restrict the spread of the worm within the DMVPN network.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of preventing infection propagation in a Dynamic Multipoint Virtual Private Network comprising:
receiving an indication at a hub router that a spoke router site, including a spoke router in communication with said hub router, has become infected;
sending a purge message to said spoke router, said purge message directing said spoke router to purge at least one next-hop request;
wherein the at least one next-hop request is a request to determine a next hop to send one or more packets;
purging, by said spoke router, the at least one next-hop request from a database;
refraining, by said spoke router, from resolving one or more next-hop requests; and
receiving an indication at said hub router that the spoke router site including said spoke router in communication with said hub router is no longer infected, and sending a resume message to said spoke router
wherein the hub router comprises a processor.

2. The method of claim 1 further comprising sending, by said spoke router, a purge reply message to said hub router acknowledging the purging of the at least one next-hop request from the database.

3. The method of claim 1 further comprising invalidating, by said hub router, next-hop information for said spoke router at other spoke routers in communication with said hub router.

4. The method of claim 1 further comprising said hub router refusing to receive traffic from said spoke router.

5. The method of claim 1 further comprising said hub router receiving traffic from said spoke router and forwarding said traffic to a traffic cleansing device.

6. The method of claim 5 further comprising said hub router receiving cleaned traffic from said traffic cleansing device, and forwarding said cleaned traffic to appropriate spoke routers.

7. The method of claim 1 wherein said receiving an indication at a hub router that a spoke router site including said spoke router in communication with said hub router has an infection further comprises said hub router sending an Access Control List (ACL) to said spoke router.

8. The method of claim 7 further comprising said spoke router installing said ACL such that said ACL causes traffic from said spoke router to other spoke routers to be dropped at said spoke router.

9. The method of claim 8 further comprising said ACL causing traffic from said spoke router to said hub router to be dropped by said spoke router.

10. The method of claim 1 further comprising:
receiving said resume message at said spoke router;
sending a reply to said resume message to said hub router; and
sending particular next-hop requests to said hub router that are associated with said hub router.

11. The method of claim 1 wherein said receiving an indication at a hub router that a spoke router site including a spoke router in communication with said hub router has become infected comprises exceeding a limit for one of the group consisting of a number of resolution requests sent from said spoke router to said hub router and a number of resolution replies sent from said hub router to said spoke router.

12. A hub router comprising:
a memory;
a processor;
a communications interface;
an interconnection mechanism coupling the memory, the processor and the communications interface; and
wherein the memory is encoded with instructions that when performed on the processor, cause the hub router to be capable of performing the operations of:
receiving an indication that a spoke router site, including a spoke router, has become infected;

sending a purge message to said spoke router, said purge message directing said spoke router to purge at least one next-hop request wherein the at least one next-hop request is a request to determine a next hop to send one or more packets; and receiving an indication that said spoke router site, including the spoke router, is no longer infected, and sending a resume message to said spoke router.

13. The hub router of claim 12 wherein said hub router invalidates next-hop information for said spoke router at other spoke routers and also forces no more next-hop resolution for said spoke router at other spoke routers, by sending the purge request to the other spoke routers.

14. The hub router of claim 12 wherein said network device refuses to receive traffic from said spoke router.

15. The hub router of claim 12 wherein said network device receives traffic from said spoke router and forwards said traffic to a scrubber.

16. The hub router of claim 15 wherein said network device receives cleaned traffic from said scrubber, and forwards said cleaned traffic to appropriate spoke routers.

17. The hub router of claim 12 wherein said receiving an indication that a spoke router in communication with said hub router has an infection further comprises sending an Access Control List (ACL) to said spoke router.

18. A hub router comprising:
a memory;
a processor;
a communications interface;
an interconnection mechanism coupling the memory, the processor and the communications interface;
wherein the memory is encoded with instructions that when executed on the processor configure the hub router with:
means for receiving an indication that a spoke router site, including a spoke router, has become infected; and
means for sending a purge message to said spoke router, said purge message directing said spoke router to purge at least one next-hop request
wherein the at least one next-hop request is a request to determine a next hop to send one or more packets; and
means for receiving an indication that the spoke router site, including the spoke router, is no longer infected, and sending a resume message to the spoke router.

19. One or more non-transitory computer readable storage mediums comprising instructions, which when executed by one or more processors, cause:
receiving an indication at a hub router that a spoke router site, including a spoke router in communication with said hub router, has become infected;
sending a purge message to said spoke router, said purge message directing said spoke router to purge at least one next-hop request; and
wherein the at least one next-hop request is a request to determine a next hop to send one or more packets;
purging, by said spoke router, the at least one next-hop request from a database;
refraining, by said spoke router, from resolving one or more next-hop requests; and
receiving an indication at said hub router that the spoke router site, including said spoke router in communication with said hub router, is no longer infected, and sending a resume message to said spoke router.

20. The one or more non-transitory computer readable storage mediums of claim 19, further comprising instructions, which when executed by the one or more processors, cause: sending, by said spoke router, a purge reply message to said hub router acknowledging the purging of the spoke router database.

21. The one or more non-transitory computer readable storage mediums of claim 19, further comprising instructions, which when executed by the one or more processors, cause: invalidating, by said hub router, next-hop information for said spoke router at other spoke routers in communication with said hub router.

22. The one or more non-transitory computer readable storage mediums of claim 19, further comprising instructions, which when executed by the one or more processors, cause: said hub router refusing to receive traffic from said spoke router.

23. The one or more non-transitory computer readable storage mediums of claim 19, further comprising instructions, which when executed by the one or more processors, cause: said hub router receiving traffic from said spoke router and forwarding said traffic to a traffic cleansing device.

24. The one or more non-transitory computer readable storage mediums of claim 23, further comprising instructions, which when executed by the one or more processors, cause: said hub router receiving cleaned traffic from said traffic cleansing device, and forwarding said cleaned traffic to appropriate spoke routers.

25. The one or more non-transitory computer readable storage mediums of claim 19, further comprising instructions, which when executed by the one or more processors, cause: dropping traffic from said spoke router to other spoke routers at said spoke router.

26. The one or more non-transitory computer readable storage mediums of claim 19, further comprising instructions, which when executed by the one or more processors, cause: dropping traffic from said spoke router to said hub router at said spoke router.

27. The one or more non-transitory computer readable storage mediums of claim 19, further comprising instructions, which when executed by the one or more processors, cause:
determining that said spoke router site including said spoke router in communication with said hub router has become infected in response to detecting a limit is exceeded for one of the group consisting of a number of resolution requests sent from said spoke router to said hub router and a number of resolution replies sent from said hub router to said spoke router.

* * * * *